2,987,825
GAGING APPARATUS
Lawrence J. Torn, Seaford, James P. Philbin, East Northport, and Laurence L. Levison, Bellerose, N.Y., assignors, by mesne assignments, to Cutler-Hammer, Inc., Milwaukee, Wis., a corporation of Delaware
Filed Oct. 11, 1957, Ser. No. 689,717
24 Claims. (Cl. 33—172)

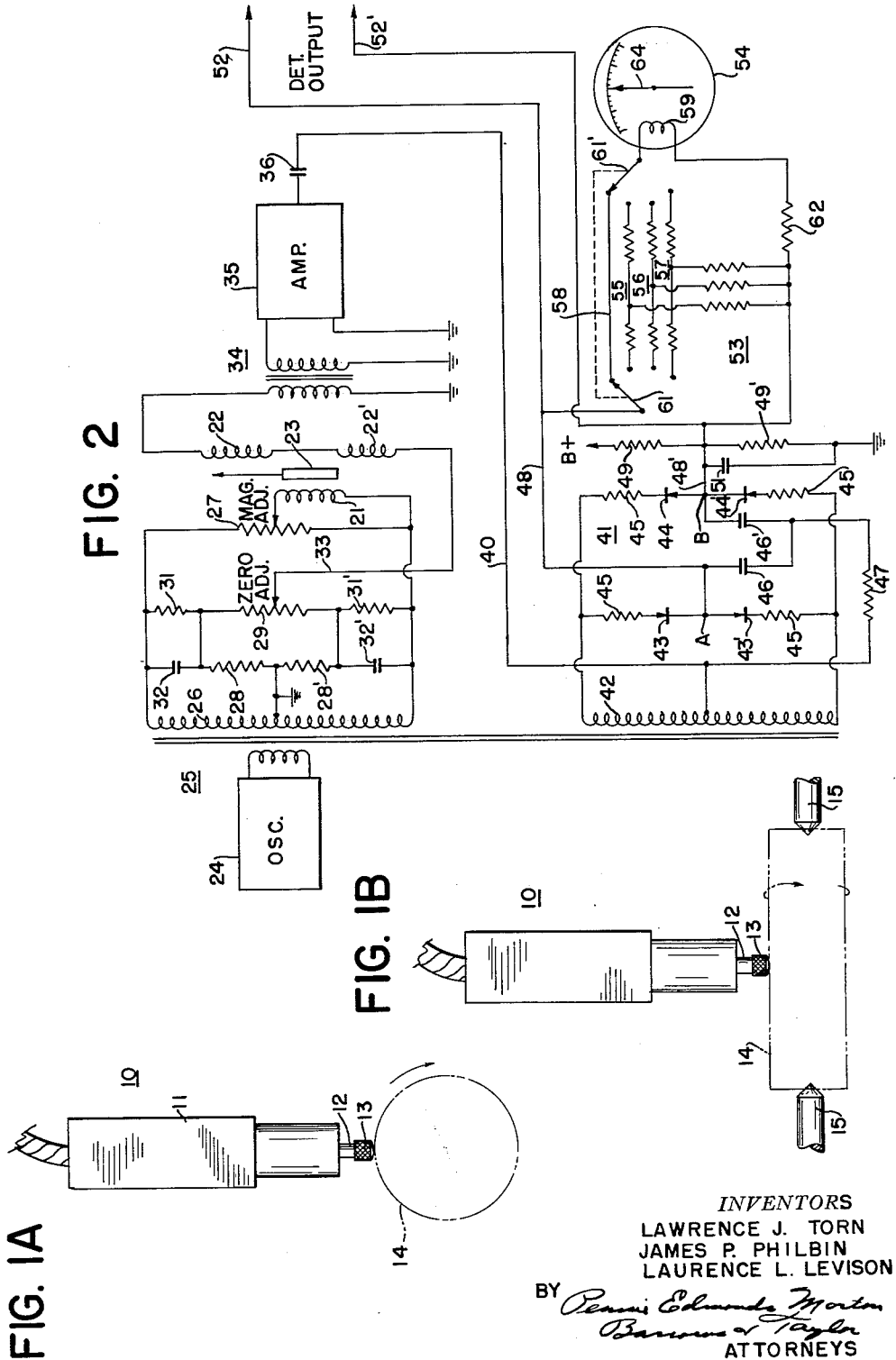

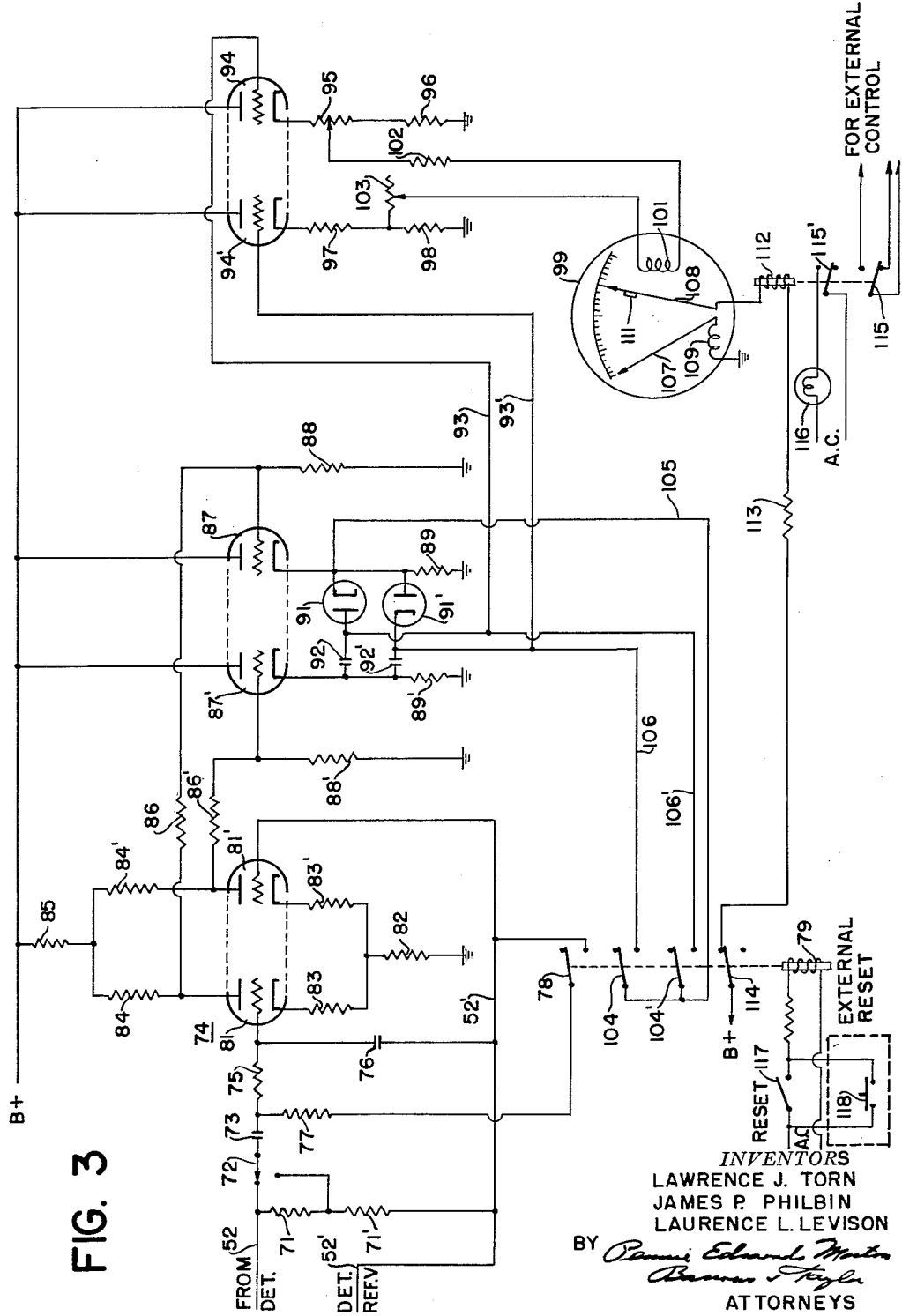

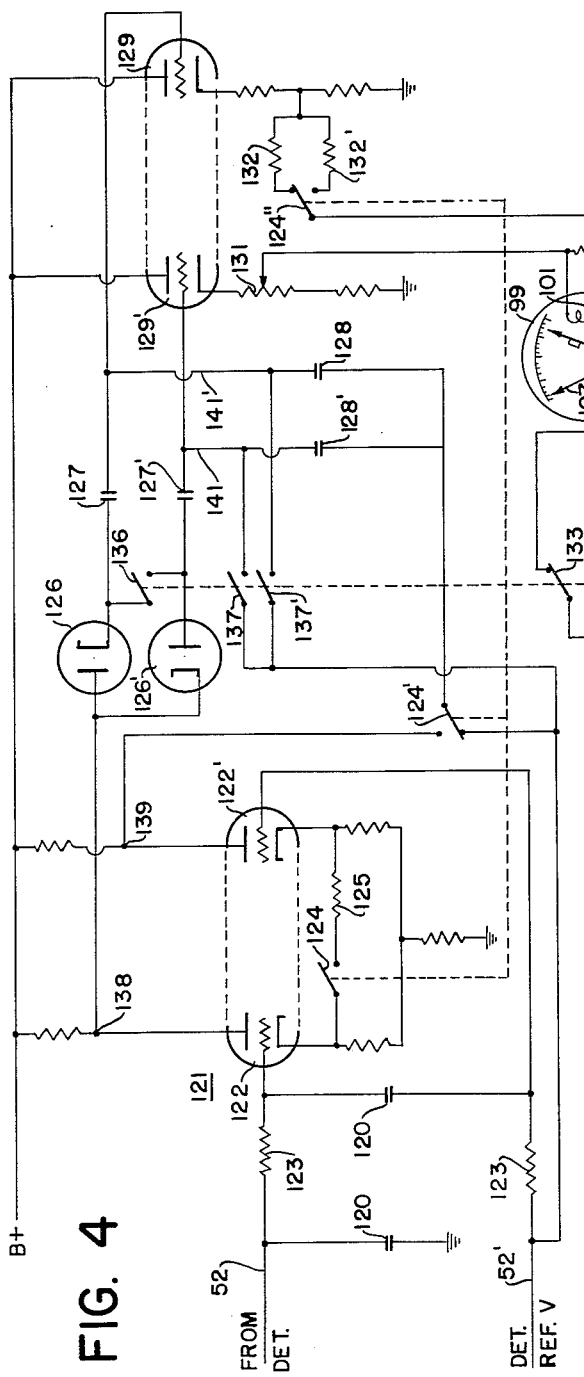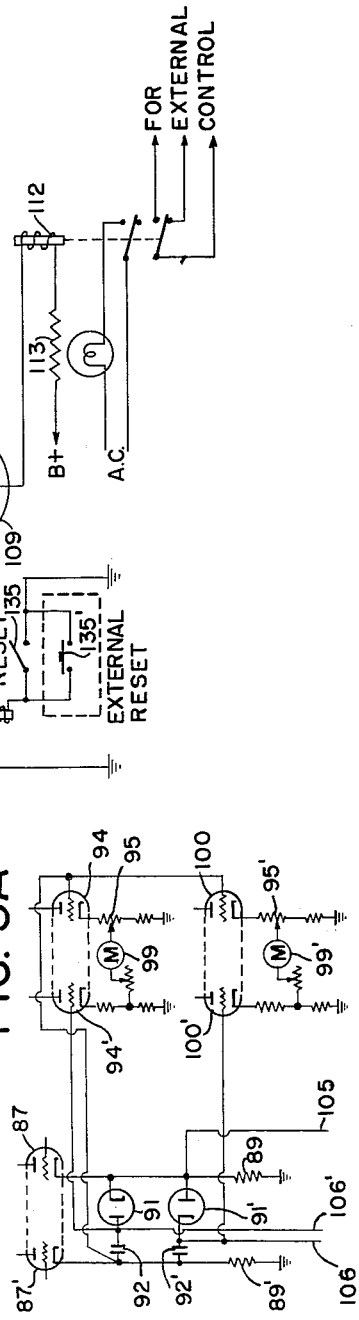
FIG. 4
FIG. 3A
INVENTORS
LAWRENCE J. TORN
JAMES P. PHILBIN
LAURENCE L. LEVISON
BY
ATTORNEYS United States Patent Office 2,987,825
Patented June 13, 1961

This invention relates to variation indicators. It is particularly directed to the indication of maximum dimensional variations in parts, such as produced by machine tools, but in certain respects is capable of broader application.

In the machine tool industry, dimensional variation, such as "runout," is of considerable importance. For example, a supposedly circular cylindrical part may often have a cross-section which is not a true circle, or the surface may be somewhat conical. As another example, a supposedly spherical part may not have a truly constant diameter in all directions. Such dimensional variation can be determined by gaging the diameter or radius of the part as the part is rotated, or as the part is translated in the axial direction, or both. The successive readings can be recorded and the runout or other dimensional variation determined by calculation. This procedure is time-consuming and subject to errors in calculating, and in general is not well adapted to high speed quantity production.

It is therefore highly desirable to have an instrument which can measure the dimensional variation rapidly and precisely, and indicate the variation in a simple manner without requiring calculation.

In specifying tolerances, it is often required that the average dimension from part to part be kept within certain limits, and also that the runout or other dimensional variation of a given part be kept within certain limits, the latter usually being more stringent. Thus is it important for a variation indicator to be able to indicate the dimensional variation in a given part with precision despite considerable variation in the average dimension from part to part.

In accordance with the present invention, an instrument is provided which is capable of determining dimensional variation with great accuracy, and the variation can be presented as a steady reading on a direct-reading indicator. The reading can be retained for a considerable length of time, if desired. The accuracy is unaffected by such factors as average dimension or rate of variation within the normal range of the instrument. Also, accurate readings can be obtained even though the dimensional variation may not follow the symmetrical sinusoidal form more commonly encountered in practice. A single traversal of the measuring path suffices for an accurate indication, thereby enabling parts to be measured in rapid succession. However, additional traversals or fractional traversals can take place without changing the indication, so that operation is not critical in this respect.

In accordance with a specific embodiment of the invention, a gaging device is employed to develop a gage signal which varies with the part dimension as the part or gage head is rotated, translated, or otherwise moved relative to the other during the gaging period. This gage signal is supplied to a pair of peak detector circuits which store signals corresponding to the maximum and minimum dimensions of the part being gaged. These stored signals are then supplied to an indicating device (such as a simple direct-reading meter) in subtractive relationship so that the indication represents the difference between the maximum and minimum dimensions of the part. The discharge times of the peak detector circuits are sufficiently long so that the stored signals do not change substantially during the gaging period nor, advantageously, for a considerable time thereafter. Hence, the indication is retained for a sufficient length of time to allow convenient reading or recording.

Reset means is provided so that, after the dimensional variation of a given part has been measured, the apparatus can be placed in condition for another measurement.

In measuring dimensional variations, it will ordinarily not be known whether the initial value of the gage signal corresponds to a maximum or a minimum dimension, or to some value in between. Unless special provision were made, this would require re-zeroing the meter for each measurement, which is time-consuming, and even then might impair the accuracy of the indication. Consequently, in accordance with a feature of the invention, an initial potential relationship is established in the peak detector circuits such that the indicator is automatically brought to zero initially, and the initial operating points for subsequent portions of the circuit are always substantially the same.

Also, inasmuch as the average size may change from part to part, in accordance with a further feature of the invention provision is made to reset the instrument in the presence of a gage signal from the part to be measured in such manner that this change does not affect the accuracy of indication.

These and other features of the invention will in part be pointed out in the description of specific embodiments thereof, and in part will be obvious therefrom.

While the invention is especially directed to the measurement and indication of the difference between maximum and minimum dimensions of a given part, the apparatus can be used for other purposes, with appropriate modifications where required. For example, it may be desired to determine the maximum amount by which the dimension varies in one direction only, either oversize or undersize. Or, separate indications of both maximum oversize and maximum undersize variations may be required.

The invention will be more fully understood from the following description of specific embodiments thereof, taken in conjunction with the drawings.

In the drawings:

FIGS. 1A and 1B are front and side views of a gage head in contact with a part whose dimensional variation is to be measured;

FIG. 2 is a circuit diagram of a suitable gaging unit for developing a gage signal varying with part size;

FIG. 3 is a circuit diagram of a preferred form of variation indicator unit of the invention; and FIG. 3A shows a modification of the circuitry in FIG. 3.

FIG. 4 is a circuit diagram of another embodiment of a variation indicator unit.

Referring to FIGS. 1A and 1B, the gage head 10 comprises a housing 11 containing a linear variable differential transformer having a movable element attached to rod 12. The rod is movable longitudinally of the housing 11 and a gage tip 13 is attached to the end thereof. The shape of the gage tip will depend upon the part being measured, and is here shown as a simple rounded tip adapted to contact the cylindrical surface of the part 14 whose dimensional variation is to be measured. Part 14 is here shown as rotatable between centers 15, and the gage head may be mounted in a suitable stand.

If it is desired only to measure runout at a given cross-section, the gage head may be held stationary and the part 14 rotated. If it is desired to measure runout at several different cross-sections, the gage head may be moved to various positions along the part 14, and the part rotated at each position. If it is desired to measure taper or other variations in the radius lengthwise of part 14, the gage head may be mounted on a slide, etc.

As shown, the gage head will respond to variations in the radius of part 14 about an axis determined by centers 15. If it is desired to measure variations in diameter instead, the gage head may be mounted in a suitable caliper.

The gaging unit shown in FIG. 2 develops a D.-C. gage signal whose amplitude varies with part size, and the polarity of the D.-C. signal with respect to a reference potential is opposite for variations in part size over and under a predetermined size. Means are provided for indicating the part size in any given position of the part being measured. This is useful in initial setup to make sure that the gage head is adjusted so that the gage signal is within the range for which the gaging and variation indicator units are designed. In addition, it enables the operator to determine whether the part size in any given position is within tolerance.

Referring to FIG. 2, the differential transformer physically contained within the gage head of FIG. 1 is shown as comprising a primary coil 21 and a pair of secondary coils 22, 22′ connected in opposition. The movable core 23 is attached to rod 12 (FIG. 1). When the core 23 is in its central or null position, an A.-C. current in the primary 21 will induce equal voltages in the secondary coils 22, 22′, and since the coils are connected in opposition the resultant output voltage will be a minimum (ideally zero). When the core 23 is moved, an A.-C. output signal will be obtained which varies in amplitude with departures from the null, and is of opposite phase on opposite sides of the null.

The output of oscillator 24 is supplied through a transformer 25 having a center-tapped secondary winding 26 to the primary 21 of the differential transformer. A potentiometer 27 is inserted as a gain or magnification adjustment.

Potentiometer 29 is provided as an adjustable size control, or "zero adjust" control, to facilitate setting the apparatus to nominal part size. It is supplied from the output of the oscillator 24 and is adjustable to provide an A.-C. correction signal of adjustable amplitude and selectable opposite phase. As here shown, the potentiometer is connected across the secondary 26 through resistors 31, 31′ shunted by respective capacitors 32, 32′. The midpoint of the potentiometer is effectively connected to the center tap of winding 26 by shunting the potentiometer with two equal resistors 28, 28′, and connecting the center tap to the junction of the resistors. The center tap may be grounded as shown.

It will be seen that when the slider of potentiometer 29 is in its central position, it is at ground potential. However, when the slider is moved, an A.-C. voltage is obtained whose amplitude varies with the departure from the central position, and is of opposite phase on opposite sides of the central position. The slider is connected through line 33 to secondary coil 22′ of the differential transformer. Thus, the A.-C. voltage from the potentiometer is added (algebraically) in series with the output voltage developed by the differential transformer. The capacitors 32, 32′ shunting resistors 31, 31′ shift the phase of the A.-C. voltage applied to the ends of potentiometer 29, and the values are selected so that the output of potentiometer 29 is exactly in phase, or exactly out of phase, with the output of the differential transformer, depending on which side of the respective nulls the potentiometer slider and differential transformer core are positioned.

The output of the differential transformer, with the zero adjust voltage added thereto, is supplied through the transformer 34 to an amplifier 35 and thence through coupling capacitor 36 and line 40 to the detector circuit 41. In the detector circuit a reference A.-C. voltage is obtained from oscillator 24 through the center-tapped secondary 42 of transformer 25. This reference voltage is applied to a bridge circuit containing two pairs of unilaterally conducting devices, here shown as crystal diodes 43, 43′, and 44, 44′. Matched resistors 45 are inserted in series with the diodes to eliminate the effect of diode forward impedance mismatch with the secondary 42 of the transformer. The amplitude of the oscillator voltage across 42 is made sufficiently high so that diodes 43, 43′ become strongly conducting in one-half of the cycle, and diodes 44, 44′ become strongly conducting in the other half of the cycle.

Line 40, which supplies the signal to the detector, is connected to the center tap of secondary 42. This A.-C. signal wave is a sine wave and, when it is in phase with the voltage across secondary 42, a rectified voltage will be developed between the points A and B so that A is positive with respect to B. When the signal is opposite in phase, point B will be positive with respect to A. Storage capacitors 46, 46′ are connected to points A and B, respectively, and their other terminals returned through resistor 47 to the center tap of transformer secondary 42. These storage capacitors, by virtue of their filtering action, produce a substantially steady voltage in the output lines 48, 48′ of the detector.

A positive voltage at A may be made to correspond to either oversize or undersize positions of core 23 of the differential transformer, depending on the phase of the oscillator voltage applied to primary 21 and secondary 42, and the number of phase reversals in the signal path, as will be understood. Here it is assumed that A is positive for oversize conditions.

The D.-C. output voltage across points A and B may be referenced to any desired potential by connecting a potential to a suitable point in the detector circuit. As here shown, point B is normally referenced to a positive potential by connecting line 48′ to a voltage divider from the B+ power supply. This voltage divider comprises resistors 49, 49′, and a capacitor 51 is shunted across the latter resistor for filtering purposes.

The output of the detector is supplied to the output lines 52, 52′ which are connected to the variation indicator unit shown in FIG. 3. It is also supplied through a variable attenuator indicated generally as 53 to a meter 54, advantageously of the zero-center type. The individual attenuators 55, 56, 57 are designed so that substantially the same impedance is presented to the detector in the several positions of switch 61, 61′. In this manner, changing the position of the switch does not change the load on the detector, and hence the output of the detector at lines 52, 52′ is substantially unaffected.

Before proceeding to the variation indicator units, the adjustment and operation of the gaging unit of FIG. 2 will be described. In initial set-up, if a part of the desired nominal size is available, it may be inserted under the gage head (FIGS. 1A and 1B) and the meter 54 brought to approximately zero by proper positioning of the gage head in the gage stand, caliper, etc. For this adjustment, the zero adjust potentiometer 29 may be in its central position. Then to bring the meter 54 exactly to zero, potentiometer 29 may be adjusted. For the final adjustment, attenuator 53 is advantageously switched to the most sensitive meter range, as shown.

Meter 54 will ordinarily be calibrated to read part size deviation in decimal parts of an inch, and the several positions of the attenuator 53 will introduce fixed multiplying factors. To insure that the indicated deviation on meter 54 is correct, after adjusting the zero as described, a shim of known thickness can be placed between the gage tip 13 (FIG. 1) and the workpiece, and the magnification adjust potentiometer 27 adjusted (if necessary) until the proper reading is obtained.

If a part of precise nominal size is not available, a part of known size can be placed under the gage head. If necessary, the meter deviation accuracy can be checked by the shim method just explained. Then, by adjusting the position of the gage head and potentiometer 29, the meter may be made to read the difference between the known size of the part being measured and the desired nominal size. Thereafter, meter indications will be with reference to nominal size.

The gaging unit of FIG. 2 is described in copending application Serial No. 674,876, filed July 29, 1957 by Torn and Philbin, and certain features are claimed therein.

Referring now to FIG. 3, the output from the gaging unit is supplied through lines 52, 52' to a pair of resistors 71, 71' forming a voltage divider for range switching. Range switch 72 supplies either the entire gage signal or a selected fraction thereof through a series capacitor 73 to the input of an amplifier generally designated as 74. A series resistor 75 and shunt capacitor 76 are provided as a low pass filter circuit to eliminate the effect of spikes and other transients which might disturb the operation of the variation indicator. A resistor 77 leads from the output side of capacitor 73 to switch arm 78 of reset relay 79 for a purpose to be described later.

Amplifier 74 comprises two triode sections 81, 81' connected as a D.-C. amplifier with balanced outputs. Sections 81, 81' are here shown as two sections of a double triode, but separate triodes, or other types of tubes may be employed if desired. The control grid of section 81 is supplied with the gage signal and the control grid of section 81' is connected to input line 52' which provides a positive reference voltage. The two sections are cathode-coupled by resistor 82. Individual cathode resistors 83, 83', preferably of equal value, provide negative feedback to improve linearity. Individual plate load resistors 84, 84' are provided, and lead through a common resistor 85 to a power source denoted B+. This type of amplifier is known per se, and has been found to give excellent linearity and stability. However, other forms of amplifiers may be employed if desired.

The outputs of amplifier sections 81, 81' are D.-C. connected through resistors 86, 86' to the grids of triode sections 87, 87', the latter functioning as cathode followers. Grid resistors 88, 88' lead from the respective grids to ground. The anodes of the sections 87, 87' are connected to B+ and output voltage is developed across cathode resistors 89, 89', preferably of equal value. Due to the balanced arrangement of the circuits of amplifier 74 and of the two cathode-follower sections 87, 87', if the applied signal between the grids of amplifier sections 81, 81' is zero, the output voltages across cathode resistors 89, 89' will be equal with matched tubes and circuit components. When the input signal departs from zero, the output voltages from sections 81, 81' vary by equal amounts but in opposite directions, thus causing the cathodes of sections 87, 87' to vary by equal amounts but in opposite directions.

A pair of peak detector circuits, each comprising a rectifier 91, 91' and a capacitor 92, 92' in series therewith, are connected between the cathodes of sections 87, 87'. The rectifiers are oppositely poled so that the stored signals on capacitors 92, 92' correspond to maximum and minimum values of the gage signal supplied thereto. For example, assume that the signal applied to input line 52 is positive with respect to the reference voltage of line 52', for an oversize condition. The grid of amplifier section 81 will be positive to the grid of section 81', and the anode output voltage of section 81 will be negative to that of 81'. Consequently, the grid and cathode of cathode-follower section 87 will be negative to corresponding elements of section 87'. Thus, rectifier 91 will pass current and charge capacitor 92 in the negative direction. Capacitor 92 will therefore store a signal voltage representing an oversize condition.

Conversely, if the input signal at line 52 is negative to the reference voltage, diode 91' will pass current to charge capacitor 92' in the positive direction, and the output voltage of capacitor 92' will represent an undersize condition.

As the input gage signal varies, capacitors 92 and 92' will be charged to voltages corresponding to the maximum positive and negative excursions of the input signal, respectively. At the end of the gaging period (one or more traversals of the desired path), these voltages will hence correspond to maximum oversize and maximum undersize conditions. Inasmuch as the capacitors charge to the peak values of the signal applied thereto, the manner in which the signal varies in between peak values is immaterial, and proper operation is not restricted to any particular form of dimensional variation.

Capacitors 92, 92' are D.-C. connected through lines 93, 93' to respective grids of triode sections 94, 94' to supply the peak detector outputs thereto. Sections 94, 94' function as cathode followers and their anodes are connected to B+. The cathode circuit of section 94 is here shown as contaninug a potentiometer 95 and resistor 96 in series to ground. That of section 94' contains resistors 97 and 98 in series to ground. An indicating meter 99 has its actuating coil 101 connected through resistor 102 to the movable contact of potentiometer 95, and through a variable resistor 103 to the junction of resistors 97 and 98. Potentiometer 95 provides a zero adjustment for the meter 99 and variable resistor 103 permits adjusting the full scale indication. This latter adjustment therefore provides a gain calibration.

Advantageously, the total resistance of resistors 95 and 96 is approximately equal to that of resistors 97 and 98, so that the cathode follower sections 94, 94' operate under similar conditions. However, the ratios of the resistor values in the two cathode circuits may be made somewhat different so as to provide a sufficient range of adjustment for zeroing the meter 99. The values of resistors 102 and 103 may be selected in view of the current requirements of meter 99 and the desired gain calibration.

Inasmuch as the voltages in lines 93 and 93' will vary in opposite directions with respect to their initial values as the measurement proceeds (corresponding to maximum oversize and undersize measurements), the cathode outputs of sections 94, 94' will likewise vary in opposite directions with respect to their initial values. The meter 99 is connected to respond to the difference between the cathode outputs, thereby responding to the difference between maximum oversize and maximum underside dimensions. The meter indication therefore represents the maximum variation in part dimension.

For rapid measurement, the peak detector circuits are advantageously arranged so that the charging time constants are very short. In this embodiment, the detector circuits are fed from cathode followers, and hence the charging impedances are low.

On the other hand, the discharge time constants of the peak detector circuits should be sufficiently long so that their stored signals do not decay substantially during the gaging period, nor preferably for a considerable time thereafter. Thus, the meter accurately indicates the difference between the peak values attained during the gaging period, and the indication is retained for a sufficient time to permit convenient reading.

As specifically shown, the rectifiers 91, 91' are thermionic diodes which can be selected to have a very high resistance in the non-conducting direction. The load circuits of capacitors 92, 92' are the respective input impedances of triode sections 94, 94' which, since the triodes operate as cathode followers, can be made very high. Essentially only leakage discharge paths are present across capacitors 92, 92' so that long storage times are obtained.

The actual length of time during which the signals must be stored will depend upon the expected duration of the gaging period, and on the required accuracy of indication. Discharge time constants of a half hour or so can readily be obtained in practice and suffice for most practical applications. Where required, longer discharge times can be obtained with care in design.

The functioning of series capacitor 73 will now be described in some detail. In using the variation indicator in commercial operations, it will often be found that the average size of one part will be considerably different from that of another part, whereas the dimensional variation of either part may be small compared to the change in average size from part to part. Thus it may be desired to use a full scale range of, say, ±0.005 inch in the gaging unit and a full scale range of, say, 0.001 inch in the variation indicator, a 10:1 ratio. In a particular instrument a change from —0.005 to +0.005 inch might, for example, correspond to a 25 volt change in the gage signal (±12.5 volts with respect to the reference potential). Then a 0.001 inch dimensional variation would correspond to 2.5 volts between positive and negative peaks in the gage signal.

Since, without capacitor 73, the amplifier 74 and the subsequent cathode followers 87, 87' would have to measure the 2.5 volt variation in any part of the 25 volt range, a high degree of linearity over this entire range would be required to preserve accuracy of indication. Such perfect linearity is difficult to achieve in practice, and in any event is expensive and poses maintenance problems. Therefore, in accordance with an important feature of the invention, the series capacitor 73 is arranged to be charged during resetting to bring amplifier 74 and subsequent circuits to predetermined initial operating points at the beginning of each gaging period. Thus, amplifier 74 and subsequent circuits operate in a relatively narrow range for a given dimensional variation, even though the initial value of the input signal may change over a much wider range.

In the specific embodiment of FIG. 3, when switch 78 is closed by energizing reset relay 79, the right-hand or output side of capacitor 73 is connected through resistor 77 to line 52'. This brings the output side of capacitor 73 to the reference potential, corresponding to zero input signal, and the grids of amplifier sections 81, 81' will be at the same potential. If, at the same time, a signal is present in line 52 of, say, +10 volts with respect to the reference potential, the input side of capacitor 73 will be +10 volts with respect to its output side. Accordingly, the capacitor will be charged through resistor 77 until a 10 volt drop exists across it.

Upon releasing reset relay 79, the charging circuit will be broken and the 10 volt drop will remain across capacitor 73. The input circuit of amplifier 74 is of very high impedance and care may be taken to employ very low loss capacitors for 73 and also for 76. Thus, the discharge time of capacitor 73 may be made very long compared to the gaging period. In effect, once capacitor 73 is charged to a particular voltage during reset, it functions essentially as a battery of that voltage during the ensuing gaging period.

If the initial value of the gage signal during reset is negative to the reference potential, say —5 volts, capacitor 73 will charge until a 5 volt rise in voltage exists across it. After releasing the reset relay, this voltage remains across the capacitor and the input voltage to the grid of amplifier section 81 will be 5 volts above the input signal in line 52 during the gaging period.

The overall result is that when the variation indicator unit is reset in the presence of an initial gage signal, a voltage is stored across capacitor 73 which is equal in magnitude to the signal voltage and of opposed polarity. The initial operating point of amplifier 74 is always that corresponding to a zero input signal at the beginning of each gaging period. Further, since there are D.-C. circuit connections from the output side of capacitor 73, through amplifier 74, and through cathode followers 87, 87' to the peak detector circuits, the initial points of operation of the cathode followers and the voltage across the peak detector circuits will always be the same regardless of the initial value of the gage signal in line 52. Thus, the range of operation over which linearity is required is much reduced. Also, with adequate matching of tube sections and components, the voltage across the peak detector circuits 91, 92 and 91', 92' will always be substantially zero at the beginning of a gaging period.

As the input signal in line 52 varies, the potential of the grid of amplifier section 81 will differ therefrom by the voltage across capacitor 73, which will be constant during any particular gaging period. Thus, the variation will be amplified and the amplified signal supplied through cathode followers 87, 87' to the peak detector circuits, and the latter will store signals coerresponding to maximum and minimum peak values of the input signal with respect to its initial value, as described hereinbefore.

Before making a measurement, it is also necessary to remove any stored signals in the peak detector circuits, so that any previously stored information will not affect the measurement to be made. In doing this, it is advantageous to bring the outputs of the peak detector circuits to a predetermined relative value in order that the indicating meter will initially read zero without further adjustment. It is further advantageous to bring the detector outputs to a fixed potential (or potentials) during reset, in addition to a fixed relative potential, so that the initial operating points of the output stages will be the same at the beginning of each gaging period.

As specifically shown in the embodiment of FIG. 3, reset relay 79 is provided with relay arms 104, 104' which are connected together and through line 105 to one side of the input to the peak detector circuits. The corresponding contacts for arms 104, 104' are connected through lines 106, 106' to the output sides of capacitors 92, 92'. Thus, when reset relay 79 is actuated, the output sides of capacitors 92, 92' are brought to a common potential, namely that of the cathode of tube section 87. At the same time, diodes 91, 91' are short-circuited to remove any charges stored by their internal capacitances.

As already described, the cathode of tube section 87' will ordinarily be at substantially the same potential as that of section 87 during reset, since the operation of capacitor 73 permits establishing the same initial operating points for each measurement. With the cathodes at the same potential, the voltage across capacitors 92, 92' will be brought to zero during reset. If, however, due to variations in the tube sections or unbalance in circuit components, the two cathodes are not at the same potential during reset, capacitors 92, 92' will be charged to the difference in the potentials so that, when the reset relay is released, no current will flow in the peak detector circuits until the input signal at line 52 changes from its initial value.

If the series capacitor 73 were omitted, and the input signal (after amplification) were applied to the peak detector circuits during reset, capacitors 92, 92' would be charged to the potential difference between the cathodes of sections 87, 87' due to the initial signal. Thus, in this case also, no current would flow in the peak detector circuits during the ensuing gaging period until the input signal changed from its initial value.

It will be noted that the output sides of capacitors 92, 92' correspond to the inputs to cathode followers 94, 94'. Thus, during reset, these input circuits are brought to a predetermined relative potential (zero, as specifically shown) and meter 99 is automatically brough to zero in resetting for measuring another part, once the zero adjustment by potentiometer 95 has properly been made. Further, due to the operation of series capacitor 73, the initial operating point of the cathode of tube 87 will be substantially fixed so that cathode followers 94, 94' will be brought to substantially the same operating points at the beginning of each measurement, thereby promoting accuracy of indication.

If the series capacitor 73 were omitted, the initial operating points for cathode followers 94, 94' would vary, depending upon the initial value of the gage signal. However, adequate results for many purposes might still be obtained. In such case linearity of operation over a much greater range would be required for comparable accuracy.

Several additional features are incorporated in the circuit of FIG. 3. In addition to being able to read the dimensional variation, it may be desired to operate external circuits whenever the indication reaches a given value. For example, it may be desired to reject parts which exceed a given runout tolerance. To this end, meter 99 has a pointer 107 which gives a visual indication of the dimensional variation, and an additional pointer 108 which can be manually set to any position along the scale. When the indicating pointer 107 contacts pointer 108, an electrical circuit is established from ground through coil 109, the contact 111, the actuating coil of relay 112, resistor 113, and the normally closed switch 114 of relay 79 to a suitable power supply, here denoted B+. Thus, an energizing circuit is established for relay 112 and operates a relay switch 115 having suitable leads for external control. At the same time, relay switch 115' closes to light indicating lamp 116, supplied from a suitable power source denoted A.-C.

Once indicating pointer 107 has contacted the settable pointer 108, coil 109 exerts a force on the indicating pointer to maintain the contact. When reset relay 79 is energized, the hold circuit is broken by the opening of relay switch 114.

Reset relay 79 may be manually operated by switch 117 which supplies power from a suitable source, here denoted as an A.-C. power supply, through a resistor to the actuating coil of the relay. In many cases, it will be desired to use the variation indicator unit to indicate dimensional variations of parts automatically as they are produced. If automatic operation is desired, an external reset switch 118 may be operated in synchronism with the feeding of parts to the gaging unit of FIG. 2.

The general manner in which the variation indicator unit of FIG. 3 can be used to measure dimensional variations will be understood from the foregoing. However, for completeness, the procedure involved in making a representative measurement will be described. Assume it is desired to measure the runout of the part 14 shown in FIGS. 1A and 1B at the cross-section with which gage pin 13 is in contact. The measuring unit shown in FIG. 2 may be adjusted as heretofore described, using a part of nominal or known size, and part 14 inserted. The output signal in line 52 may be equal to the reference voltage of line 52', or positive or negative to the reference voltage, depending upon the size of the part at the radius being initially gaged. Range switch 72 (FIG. 3) may be placed in its more sensitive position as shown, or in the less sensitive position if the dimensional variation is expected to be large. In practice, the more sensitive position may be used until the meter 99 reads off scale.

With part 14 at rest, reset relay 79 is operated to charge condenser 73 to the difference between the signal potential in line 52 and the reference potential, thereby establishing an initial operating point for amplifier 74 and cathode followers 87, 87'. At the same time, the output sides of capacitors 92, 92' are brought to a common potential, thereby removing any previously stored charges. If necessary, meter 99 can be brought to zero by adjustment of potentiometer 95.

The apparatus is then in condition for measuring runout, and part 14 can be rotated through one full revolution or more. During this gaging period capacitors 92 and 92' will store signals corresponding to maximum and minimum radii as part 14 is rotated, and the difference therebetween will be indicated by meter 99, thereby giving a direct indication of runout.

For measuring subsequent parts within the range of the instrument, the adjustments of the units of FIG. 2 and FIG. 3 can be left unchanged, and the reset relay 79 actuated as each part is placed in gaging position.

To check the scale setting of meter 99, a part of known runout can be used for part 14, and variable resistor 103 adjusted to give the correct scale reading. Alternatively, after the variation indicator has been reset and with the part still at rest, a shim of known thickness may be slipped carefully between the gage tip 13 and part 14, and the runout indication on meter 99 should correspond to the thickness of the shim. With an electrical zero adjust 29 and meter 54 as in the unit of FIG. 2, a still simpler procedure is to move the zero adjust control over an appropriate range and note whether the readings on meter 99 correspond to those on meter 54.

Upon occasion, it may be desired to indicate separately the maximum oversize and maximum undersize variations in part size. The unit of FIG. 3 may readily be modified for this purpose. For example, the input grids of cathode followers 94, 94' may be connected across one of the peak detector capacitors, say 92, as shown in FIG. 3A. With the polarity of signal heretofore assumed, meter 99 will then indicate the maximum oversize variation from the initially measured dimension of the part. An additional pair of cathode followers and another meter 99' may be connected across capacitor 92' to indicate the maximum undersize variation in the part.

The remaining circuits of FIG. 3, including the reset circuits, will be employed with the modification of FIG. 3A, as will be understood. During reset, lines 105, 106 and 106' will all be connected together so that the grids of cathode follower sections 94' and 100' will be at a common potential equal to that of the cathode of tube section 87. The grids of cathode follower sections 94 and 100 will be at the potential of the cathode of section 87'. If the circuits of 87 and 87' are precisely balanced, the charge on capacitors 92, 92' will be removed and meters 99, 99' will read zero. If there is some unbalance in stages 87, 87', the capacitors 92, 92' will charge to the difference in the cathode potentials of these two stages and potentiometers 95, 95' may be adjusted so that the meters read zero. Thereafter the meters 99, 99' will indicate maximum oversize variation and maximum undersize variation from the initial dimension of the part present during reset.

As an example of the use of the variation indicator so modified, suppose that a specification for a cam requires that the change of radius over a given angle shall not depart from that of a master cam by more than 0.001 inch in either oversize or undersize directions. The gage head 11 (FIG. 1) may be mounted so as to follow the outline of the master cam, and the gage tip 13 arranged to follow the outline of the production cam. In any given position the variation indicator unit can be reset, and then the two cams moved simultaneously through the given angle. The two meters in the modified variation indicator unit will read maximum oversize and maximum undersize variations in the production cam with respect to the master cam over the given angle.

Referring now to FIG. 4, in this embodiment certain modifications are shown to indicate various ways of employing the invention in practice. Here a cathode coupled D.-C. amplifier 121 is employed which is similar to amplifier 74 of FIG. 3, but differs in detail. The input signal in line 52 is supplied to the grid of the first triode section 122 by a D.-C. connection. The reference voltage in line 52' is applied to the grid of triode section 122'. Resistors 123 and capacitors 120 are provided for filtering out transients, etc. It will be noted that, due to the omission of the series condenser 73 in the input circuit, the operating region of amplifier 121 will be different for input signals of different average value.

A switch 124 and resistor 125 connected between the cathodes permits altering the gain of the amplifier. The output of triode section 122 is supplied to a pair of rectifiers 126, 126', here shown as thermionic diodes. In series with the diodes are capacitors 127, 127' and 128, 128'. The latter (128, 128') serve as signal storage capacitors for peak detection, and the former (127, 127') serve a purpose similar to that of series capacitor 73 in FIG. 3 in that they participate in setting initial operating points for the peak detector rectifiers and for the output cathode followers. The diodes are oppositely poled so that capacitors 128, 128' store signals corresponding to maximum and minimum values of the input signal. Inasmuch as auxiliary capacitors 127, 127' are not only in the signal paths to diodes 126, 126', but also are between the diodes and the signal storage capacitors 128, 128', a portion of the rectified voltage appears thereacross. Hence the auxiliary capacitors are advantageously much larger than the signal storage capacitors so that most of the rectified voltage appears across the latter and is available for operating the output meter circuit.

The charging circuits for the peak detectors are completed through switch arm 124' to either the reference voltage in line 52' or the output of triode section 122', depending upon the setting of switch 124'. Since the outputs of amplifier sections 122, 122' are normally equal, and vary in opposite directions from the no-signal value, in the position shown only half of the available amplified voltage is applied to the peak detector circuits. With switch 124' in its upper position, the full output of amplifier 121 is applied to the peak detectors.

The outputs of the peak detector circuits are supplied by D.-C. connections to the grids of triode sections 129, 129' which function as cathode followers. The signals in the cathode circuits are supplied in subtractive relationship to actuating coil 101 of meter 99 in a manner similar to that shown in FIG. 3. Potentiometer 131 permits adjusting the zero of the meter. Instead of using a continuously variable resistance as a scale adjustment, two resistors 132, 132' and switch 124" are provided for range switching. If desired, these resistors can be individually adjustable.

Relay 112 is connected to the settable pointer 108 so that it will be actuated when indicating pointer 107 completes the circuit with pointer 108. The arrangement is similar to that of FIG. 3 except that the relay switch 133 of reset relay 134 is in the ground lead of coil 109, rather than in the B+ lead of relay 112.

In order to reset the unit ready for a measurement, reset relay 134 is actuated by manual switch 135 (or by the external reset switch 135') and moves switch arms 133, 136, 137 and 137' to their lower positions. The opening of switch arm 133 breaks the hold circuit of meter 99. The closing of switch arm 136 short-circuits the two diode circuits between the diodes and one side of capacitors 127, 127'. The closing of switches 137, 137' brings the other sides of these capacitors, the output sides of capacitors 128, 128' and the grids of cathode-followers 129, 129' to the reference potential in line 52'.

With a zero input signal in line 52 (equal to the reference potential of line 52'), the potential of point 138 in the output of amplifier section 122 will have some positive value determined by the operating conditions of the circuit, and this potential will exist on one side of diodes 126, 126'. Assuming it to exceed the reference potential, diode 126 will conduct until capacitors 127, 127' are charged to the difference between the potential at point 138 and the reference potential. With a signal other than zero in the input line, the potential of point 138 will be positive or negative to its no-signal potential, and one or the other of diodes 126, 126' will conduct until capacitors 127, 127' are charged to the then-existing difference in potential with respect to the reference potential. At the same time any stored charges are removed from capacitors 128, 128'. This thereby brings the peak detector circuits to their initial operating points ready for making a measurement. By virtue of the D.-C. coupling with output cathode followers 129, 129', the output tubes always have the same initial operating points.

When switch 124' is in its upper position, the lower sides of the capacitors 128, 128' are connected to point 139 in the output circuit of amplifier section 122'. Thus, capacitors 128, 128' charge to the difference between the potential of point 139 and the reference potential during reset. Capacitors 127, 127' charge as before to the difference between the potential of point 138 and reference potential.

When the reset relay 134 is deenergized, the short circuit established by relay arm 136 is broken and the reference potential is removed from lines 141, 141' by the opening of switches 137, 137'. Because of the voltages established across capacitors 128, 128' and across capacitors 127, 127', the signals to the cathode followers 129, 129' will remain unchanged so long as the input signal in line 52 remains constant. However, when the input signal changes during the gaging period, the peak detector circuits will store outputs corresponding to maximum and minimum values of the input signal and a corresponding indication will be obtained on meter 99.

Switches 124, 124' and 124" are ganged together to change the range of meter 99. In the position shown, amplifier 121 is in its lower amplification position, only half of the available amplifier output is supplied to the peak detector circuits, and resistor 132 is selected so that the meter reading corresponds to the desired lower sensitivity range. When switches 124, 124' and 124" are moved to their other positions, the gain of amplifier 121 is increased, since the closing of switch 124 removes some of the negative feedback. Also, the full balanced output of amplifier 121 is applied to the peak detector circuits. Resistor 132' is selected so that the indications of meter 99 correspond to the desired more sensitive range. This switching arrangement for obtaining two different ranges has been found helpful when the two ranges are quite different, say, 10:1.

It will be noted that in FIG. 3 one series capacitor 73 suffices to establish initial operating points for amplifier 74, cathode followers 87, 87', and the inputs to the peak detector circuits, since capacitor 73 is common to the charging circuits for both peak detector circuits and is D.-C. connected thereto. In FIG. 4, two series capacitors 127, 127' are employed, since they are in separate charging circuits for the peak detectors. While it is preferred to place the series capacitor means ahead of the amplifier, as in FIG. 3, it may be placed elsewhere in the signal path to the peak detector circuit if desired, and one or more individual capacitors may be employed depending on where the series capacitor means is inserted.

A positive reference potential has been employed in the variation indicator units of FIGS. 3 and 4 since it is easily obtained from the unit of FIG. 2 and permits grounding the cathode circuit of the input amplifier while preserving a sufficient range of operation and adequate linearity. If desired, the reference voltage may be at ground or other potential, and a suitable negative power supply employed for the cathode circuit of the amplifier. In FIG. 4 the same reference potential has been employed for resetting the peak detector circuit and charging the series capacitors, whereas in FIG. 3 the input reference potential is employed to charge the series capacitor and a potential available in the input of the peak detector circuits is employed for resetting these detectors. These and other alternatives may be employed as meets the requirements of a particular given application.

In the foregoing description, specific numerical values have occasionally been mentioned. They are intended only to facilitate explanation, and are not by way of limitation.

It will be understood that in addition to the various alternative arrangements shown in the specific embodiments of FIGS. 3 and 4 and otherwise mentioned hereinbefore, many other modifications are possible within the spirit and scope of the invention. Where desired, one or more features of the invention may be employed while omitting others.

It will also be understood that the variation indicator unit may be employed with any type of gaging unit capable of developing a suitable gage signal, the specific gaging unit of FIG. 2 being set forth for completeness and to facilitate ready use of the invention. The gaging unit and the variation indicator unit may be separately housed, with appropriate interconnections if desired. Or, the circuits and components employed to develop the gaging signal and to develop the variation indication may be combined in a single unit.

Several manners in which the variation indicator may be used in practice in the gaging of parts have been described, but it will be understood that the unit may be employed in many different environments where dimensional variations require determination.

The invention is especially useful for indicating dimensional variations of parts, such as may be produced by machine tools. However, it may be used in other environments where an electrical gage signal is produced which varies with a physical quantity to be measured and it is desired to measure and indicate the maximum variation in the physical quantity over a selected period with accuracy, particularly where the initial value of the gage signal may change over a wide range from measurement to measurement. In such cases transducers and associated equipment for developing an electrical signal may be selected to meet the requirements of the physical quantity to be measured, and the resulting gage signal supplied to the variation indicator of FIGS. 3 or 4, or suitable modifications thereof.

We claim:

1. A variation indicator for indicating maximum variations in part dimensions which comprises an input circuit for receiving a gage signal varying with part dimension, a pair of peak detector circuits supplied with said gage signal from said input circuit and poled to produce respective stored signals corresponding to maximum and minimum part dimension signals, an indicating device, circuit means supplying said stored signals to said indicating device in subtractive relationship to thereby indicate the maximum variation in part dimension, and reset means for removing said stored signals.

2. A variation indicator for indicating maximum variation in part dimension during a gaging period which comprises gaging means for developing a gage signal varying with part dimension during said gaging period, a pair of peak detector circuits supplied with said gage signal and poled to produce respective stored signals corresponding to maximum and minimum part dimension signals, the discharge time constants of said stored signals being long compared to said gaging period, an indicating device, circuit means supplying said stored signals to said indicating device in subtractive relationship to thereby indicate the maximum variation in part dimension, and reset means for removing said stored signals.

3. A variation indicator for indicating maximum variations in part dimensions which comprises gaging means for developing a D.C. gage signal varying with part dimension, a pair of peak detector circuits supplied with said gage signal, said peak detector circuits including oppositely poled rectifiers and respective capacitors for storing signals corresponding to maximum and minimum part dimension signals, an indicating device, circuit means supplying the signals stored by said capacitors to said indicating device in subtractive relationship to thereby indicate the maximum variation in part dimension, and reset means for removing the signals stored by said capacitors.

4. A variation indicator for indicating maximum variations in part dimensions which comprises gaging means for developing a D.C. gage signal varying with part dimension, a pair of peak detector circuits supplied with said gage signal in parallel, said peak detector circuits including oppositely poled rectifiers and respective capacitors for storing signals corresponding to maximum and minimum part dimension signals, a pair of amplifier tube sections having high impedance input circuits, D.C. circuit connections supplying the signals stored by said capacitors to said input circuits, an indicating device connected to the output circuits of said amplifier tube sections in subtractive relationship to thereby indicate the maximum variation in part dimension, and reset means for removing the signals stored by said capacitors.

5. A variation indicator for indicating maximum variations in part dimensions which comprises an input circuit for receiving a gage signal varying with part dimension, a pair of peak detector circuits supplied with said gage signal from said input circuit and poled to produce respective stored signals corresponding to maximum and minimum part dimension signals, indicating means responsive to said stored signals, and reset means for initially bring the outputs of said peak detector circuits to a predetermined relative value with a gage signal applied to said input circuit.

6. A variation indicator for indicating maximum variations in part dimensions which comprises gaging means for developing a gage signal varying with part dimension, an input circuit for receiving said gage signal, a peak detector circuit including a rectifier supplied with the gage signal from said input circuit and adapted to produce a stored signal corresponding to the peak value in one direction of said gage signal, storage capacitor means in series in the signal path to said rectifier, reset means for initially bringing one side of said capacitor means to a predetermined potential with a gage signal applied to the other side thereof to thereby produce a stored voltage thereacross, an indicating device, and circuit means supplying said stored signal to said indicating device.

7. A variation indicator for indicating maximum variations in part dimensions which comprises an input circuit for receiving a D.-C. gage signal varying with part dimension, a peak detector circuit including a rectifier for storing a signal corresponding to the peak value in one direction of a gage signal supplied thereto, a series storage capacitor having said D.-C. gage signal supplied to the one side thereof and the other side thereof D.-C. connected to said peak detector circuit to supply the gage signal thereto, reset means for initially bringing said other side of said series capacitor to a predetermined potential in the presence of a gage signal on said one side thereof to thereby produce a stored voltage thereacross, an indicating device, and D.-C. circuit connections supplying the signal stored by said peak detector circuit to said indicating device.

8. A variation indicator for indicating maximum variations in part dimensions which comprises an input circuit for receiving a D.-C. gage signal varying with part dimension, a pair of peak detector circuits supplied with the gage signal from said input circuit, said peak detector circuits including respective oppositely poled rectifiers and adapted to store signals corresponding to maximum and minimum part dimension signals, storage capacitor means in series in the signal paths to said rectifiers and D.-C. connected thereto, indicating means responsive to the signals stored by said peak detector circuits, and reset means actuable to bring one side of said series capacitor means initially to a predetermined potential with a gage signal applied to the other side thereof to thereby produce a stored voltage thereacross.

9. A variation indicator for indicating maximum variations in part dimensions which comprises gaging means for developing a D.-C. gage signal of amplitude varying with part dimension, the polarity of said D.-C. signal with respect to a predetermined reference potential being opposite for oversize and undersize variations, a pair of peak detector circuits adapted to store signals corresponding to maximum and minimum values of a gage signal supplied thereto, series storage capacitor means having said D.-C. gage signal supplied to the input thereof and the output thereof D.-C. connected to said peak detector circuits to supply the gage signal thereto, reset means actuable to bring the output side of said series capacitor means initially to said predetermined reference potential in the presence of a gage signal on the input side thereof to thereby produce a stored voltage thereacross, and indicating means responsive to the signals stored by said peak detector circuits.

10. A variation indicator for indicating maximum variations in part dimensions which comprises gaging means for developing a D.-C. gage signal of amplitude varying with part dimension, an input circuit for receiving said D.-C. gage signal, a pair of peak detector circuits supplied with the gage signal from said input circuit, said peak detector circuits including respective oppositely poled rectifiers and respective capacitors for storing signals corresponding to maximum and minimum part dimension signals, storage capacitor means in series in the signal paths to said rectifiers and D.-C. connected thereto, indicating means responsive to the signals stored by said peak detector circuits, and reset means actuable to bring the outputs of said peak detector circuits initially to a predetermined relative value and to bring one side of said series capacitor means initially to a predetermined potential with a gage signal applied to the other side thereof to thereby produce a stored voltage thereacross.

11. A variation indicator for indicating maximum variations in part dimensions during a gaging period which comprises an input circuit for receiving a D.-C. gage signal varying with part dimension during said gaging period, a pair of peak detector circuits supplied with the gage signal from said input circuit, said peak detector circuits including respective oppositely poled rectifiers and respective capacitors for storing signals corresponding to maximum and minimum part dimension signals, capacitor means in series in the signal paths to said rectifiers and D.-C. connected thereto, the discharge time constants of said capacitors and capacitor means being long compared to the gaging period, indicating means, D.-C. circuit connections supplying the signals stored by said peak detector circuits to said indicating means, and reset means actuable to bring the outputs of said peak detector circuits initially to a predetermined potential and to bring one side of said series capacitor means initially to a predetermined potential with an initial gage signal applied to the other side thereof to thereby produce a stored voltage thereacross.

12. A variation indicator for indicating maximum variations in part dimensions which comprises gaging means for developing a D.-C. gage signal of amplitude varying with part dimension, an input circuit for receiving said D.-C. gage signal, a pair of peak detector circuits including respective oppositely poled rectifiers and respective capacitors for storing signals corresponding to maximum and minimum part dimension signals, a series storage capacitor having said D.-C. gage signal supplied to one side thereof and the other side thereof D.-C. connected to said peak detector circuits to supply the gage signal thereto, indicating means, D.-C. circuit connections supplying the signals stored by said peak detector circuits to said indicating means, and reset means actuable to connect the outputs of said peak detector circuits to a common potential and to connect said other side of the series capacitor to a predetermined potential with a gage signal applied to said one side thereof to thereby produce a stored voltage thereacross corresponding to the initial value of the gage signal.

13. A variation indicator for indicating variations in part dimensions which comprises an input circuit for receiving a D.-C. gage signal varying with part dimension, a D.-C. amplifier, a series storage capacitor in said input circuit connected to receive said gage signal and D.-C. connected to said amplifier to supply the signal thereto, a pair of peak detector circuits connected in parallel and D.-C. connected to the output of said amplifier, said peak detector circuits including respective oppositely poled rectifiers and respective capacitors in series therewith for storing signals corresponding to maximum and minimum part dimension signals, indicating means, D.-C. circuit connections supplying the signals stored by said peak detector circuits to said indicating means, and reset means actuable to connect the outputs of said peak detector circuits to a common potential and to connect the output side of said series capacitor to a reference potential with a gage signal applied to the input side thereof to thereby produce a stored voltage thereacross corresponding to the initial value of the gage signal.

14. A variation indicator for indicating maximum variations in part dimensions which comprises gaging means for developing a D.-C. gage signal of amplitude varying with part dimension, the polarity of said D.-C. signal with respect to a predetermined reference potential being opposite for oversize and undersize variations, a D.-C. amplifier, a series storage capacitor connected to receive said D.-C. gage signal and D.-C. connected to said amplifier to supply the signal thereto, a pair of peak detector circuits connected in parallel and D.-C. connected to the output of said amplifier, said peak detector circuits including respective oppositely poled rectifiers and respective capacitors in series therewith for storing signals corresponding to maximum and minimum part dimension signals, a pair of amplifier tube sections having respective high impedance input circuits and respective output circuits, D.-C. circuit connections from the capacitors of said peak detector circuits to the input circuits of said amplifier tube sections, an indicating device connected to the output circuits of said amplifier tube sections in subtractive relationship to thereby indicate the maximum variation in part dimension, and reset means actuable to connect the output sides of the capacitors in the peak detector circuits to a common potential and to connect the output side of said series storage capacitor to said reference potential with a gage signal applied to the input side thereof to thereby produce a stored voltage thereacross corresponding to the initial value of the gage signal.

15. A variation indicator for indicating maximum variations in a physical quantity which comprises an input circuit for receiving an electrical gage signal varying with said physical quantity, a peak detector circuit including a rectifier supplied with the gage signal from said input circuit and adapted to produce a stored signal corresponding to the peak value in one direction of said gage signal, storage capacitor means in series in the signal path to said rectifier, reset means for initially bringing one side of said capacitor means to a predetermined potential with a gage signal applied to the other side thereof to thereby produce a stored voltage thereacross, an indicating device, and circuit means supplying said stored signal to said indicating device.

16. A variation indicator for indicating maximum variations in a physical quantity which comprises an input circuit for receiving a D.C. gage signal varying with said physical quantity, a pair of peak detector circuits supplied with the gage signal from said input circuit, said peak detector circuits including respective oppositely poled rectifiers and adapted to store signals corresponding to maximum and minimum values of said gage signal, storage capacitor means in series in the signal paths to said rectifiers and D.C. connected thereto, indicating means responsive to the signals stored by said peak detector circuits, and reset means actuable to bring the outputs of said peak detector circuits initially to a predetermined relative value and to bring one side of said series capacitor means initially to a predetermined potential with a gage signal applied to the other side thereof to thereby produce a stored voltage thereacross.

17. A variation indicator for indicating maximum variations in a physical quantity which comprises an input circuit for receiving a D.-C. gage signal varying with said physical quantity, a pair of peak detector circuits including respective oppositely poled rectifiers and respective capacitors for storing signals corresponding to maximum and minimum values of said gage signal, a series storage capacitor having said D.-C. gage signal supplied to one side thereof and the other side thereof D.-C. connected to said peak detector circuits to supply the gage signal thereto, indicating means, D.C. circuit connections supplying the signals stored by said peak detector circuits to said indicating means, and reset means actuable to connect the outputs of said peak detector circuits to a common potential and to connect said other side of the series capacitor to a predetermined potential with a gage signal applied to said one side thereof to thereby produce a stored voltage thereacross corresponding to the initial value of the gage signal.

18. The method of indicating maximum variations in part dimensions which comprises developing a gage signal varying with part dimension during a gaging period, peak detecting the maximum excursions of said gage signal in oversize and undersize directions to develop corresponding stored signals persisting at least until the end of said gaging period, supplying said stored signals to an indicating device in subtractive relationship to thereby yield an indication of the maximum variation in part dimension during said gaging period, and removing previously stored signals prior to said peak detecting.

19. The method of indicating maximum variations in part dimensions which comprises developing a gage signal varying with part dimension during a gaging period, supplying said gage signal to a pair of peak detector circuits to produce stored signals corresponding to the maximum excursions of said gage signal in oversize and undersize directions during said gaging period and persisting substantially undiminished at least until the end of the gaging period, supplying the stored signal outputs of said peak detector circuits to indicating means, and bringing the outputs of said peak detector circuits to a predetermined relative value at the beginning of a gaging period.

20. The method of indicating maximum variations in part dimensions which comprises developing a D.-C. gage signal varying with part dimension during a gaging period, supplying said gage signal to a pair of peak detector circuits including respective rectifiers and capacitors to produce stored signals corresponding to the maximum excursions of said gage signal in oversize and undersize directions during said gaging period and persisting substantially undiminished at least until the end of the gaging period, series capacitor means being interposed in the signal path to said rectifiers, supplying the stored signal outputs of said peak detector circuits to indicating means, bringing the outputs of said peak detector circuits to a predetermined relative value at the beginning of a gaging period, and bringing the output side of said series capacitor means to a predetermined potential at the beginning of a gaging period to produce a stored voltage thereacross corresponding to the initial value of the gage signal.

21. A variation indicator for indicating maximum variations in part dimensions which comprises gaging means for developing a D.-C. gage signal varying with part dimension, an input circuit for receiving said D.-C. gage signal, a peak detector circuit adapted to produce a signal output corresponding to the maximum deviation in one direction of said gage signal, said peak detector circuit including a storage capacitor and a rectifier, circuit means supplying said gage signal from said input circuit to said peak detector circuit including the D.-C. component thereof, an indicating device, circuit means supplying said signal output to said indicating device, and reset means for initially charging said capacitor to substantially the difference between the potential at the input to said peak detector circuit and a predetermined potential with a gage signal applied to the first-mentioned input circuit.

22. A variation indicator for indicating maximum variations in part dimensions which comprises gaging means for developing a D.-C. gage signal varying with part dimension, an input circuit for receiving said D.-C. gage signal, a peak detector circuit adapted to produce a signal output corresponding to the maximum deviation in one direction of said gage signal, a substantially balanced circuit supplied with said gage signal and having a pair of output terminals adapted to drive said peak detector circuit in substantially balanced relationship, said peak detector circuit including a storage capacitor and a rectifier connected in series between said pair of output terminals, an indicating device, circuit means supplying said signal output to said indicating device, and reset means for initially charging said capacitor to substantially the potential difference between said pair of output terminals with a gage signal applied to the first-mentioned input circuit.

23. A variation indicator for indicating maximum variations in part dimensions which comprises gaging means for developing a D.-C. gage signal varying with part dimension, an input circuit for receiving said D.-C. gage signal, a pair of peak detector circuits adapted to produce respective signal outputs corresponding to maximum and minimum part dimension signals, each of said peak detector circuits including a storage capacitor and a rectifier, circuit means supplying said gage signal from said input circuit to said peak detector circuits including the D.-C. component thereof, indicating means, circuit means supplying said signal outputs to said indicating means, and reset means for initially charging said capacitors to substantially the difference between the potential at the input to each peak detector circuit and a common potential with a gage signal applied to the first-mentioned input circuit.

24. A variation indicator for indicating maximum variations in part dimensions which comprises gaging means for developing a D.-C. gage signal varying with part dimension, an input circuit for receiving said D.-C. gage signal, a pair of peak detector circuits adapted to produce respective signal outputs corresponding to maximum and minimum part dimension signals, a substantially balanced circuit supplied with said gage signal and having a pair of output terminals adapted to drive said peak detector circuits in substantially balanced relationship, said peak detector circuits each including a storage capacitor and a rectifier connected in series between said pair of output terminals with the rectifiers oppositely poled, indicating means, circuit means supplying said signal outputs to said indicating means, and reset means for initially charging said capacitors to substantially the difference between the potential at the input to each peak detector circuit and a common potential with a gage signal applied to the first-mentioned input circuit.

References Cited in the file of this patent

UNITED STATES PATENTS 2,425,987 Boykin _____ Aug. 19, 1947

FOREIGN PATENTS 594,308 Great Britain _____ Nov. 7, 1947

OTHER REFERENCES

Perthen et al.: German application Ser. No. P.9654, printed March 15, 1956 (KL. 42b, Gr. 12,05), 6 pages spec.; 1 sht. dwg. 73–105.

Ryerson et al.: "Transient Peak Voltmeter," Electronics, September 1945, pp. 110–111. (Copy in Div. 69.)

UNITED STATES PATENT OFFICE
CERTIFICATE OF CORRECTION

Patent No. 2,987,825            June 13, 1961

Lawrence J. Torn et al.

It is hereby certified that error appears in the above numbered patent requiring correction and that the said Letters Patent should read as corrected below.

Column 8, line 63, for "brough" read -- brought --; column 14, line 15, for "bring" read -- bringing --; column 15, line 65, after "indicating" insert -- maximum --.

Signed and sealed this 28th day of November 1961.

(SEAL)
Attest:

ERNEST W. SWIDER
Attesting Officer

DAVID L. LADD
Commissioner of Patents
USCOMM-DC